(12) United States Patent
Mizutani et al.

(10) Patent No.: US 7,654,099 B2
(45) Date of Patent: Feb. 2, 2010

(54) AIR CONDITIONER AND AIR CONDITIONER DUCT

(75) Inventors: Satoshi Mizutani, Nagoya (JP);
Hironobu Murakami, Hekinan (JP);
Toshihiko Muraki, Kariya (JP);
Hiroyuki Yamagishi, Okazaki (JP);
Wataru Ishikawa, Okazaki (JP)

(73) Assignees: Denso Corporation, Kariya (JP); Sekiso Corporation, Okazaki (JP)

( * ) Notice: Subject to any disclaimer, the term of this patent is extended or adjusted under 35 U.S.C. 154(b) by 380 days.

(21) Appl. No.: 11/633,680

(22) Filed: Dec. 4, 2006

(65) Prior Publication Data
US 2007/0128998 A1  Jun. 7, 2007

(30) Foreign Application Priority Data
Dec. 5, 2005  (JP) .............................. 2005-351175

(51) Int. Cl.
*F25D 19/00* (2006.01)
(52) U.S. Cl. ............................. 62/244; 62/296; 181/224
(58) Field of Classification Search ........... 62/239–244, 62/296; 181/224–225
See application file for complete search history.

(56) References Cited

U.S. PATENT DOCUMENTS

| | | | | |
|---|---|---|---|---|
| 1,916,908 A | * | 7/1933 | Lewis et al. ................. | 181/224 |
| 2,708,006 A | * | 5/1955 | Backman ..................... | 181/225 |
| 3,044,571 A | * | 7/1962 | Spiegel ........................ | 181/225 |
| 4,362,223 A | * | 12/1982 | Meier .......................... | 181/206 |
| 4,724,748 A | * | 2/1988 | Geyer ......................... | 454/120 |
| 5,167,129 A | * | 12/1992 | Akasaka ...................... | 62/179 |
| 5,728,980 A | * | 3/1998 | Zarnick ....................... | 181/224 |
| 6,415,887 B1 | * | 7/2002 | Moran et al. ................. | 181/264 |
| 6,802,690 B2 | * | 10/2004 | Han et al. .................... | 415/119 |

FOREIGN PATENT DOCUMENTS

| | | |
|---|---|---|
| JP | 2000-168834 | 6/2000 |
| JP | 2001-074302 | 3/2001 |
| JP | 2001-322544 | 11/2001 |
| JP | 2002-339298 | 11/2002 |
| JP | 2004-243816 | 9/2004 |

* cited by examiner

*Primary Examiner*—William E Tapolcai
(74) *Attorney, Agent, or Firm*—Harness, Dickey & Pierce, PLC (57) ABSTRACT

An air conditioner has an air conditioning unit for conditioning air to be introduced into a passenger compartment. The air conditioning unit has an air passage, an air conditioning case defining at least a part of the air passage and a noise absorbing member having a multi-layer structure. The noise absorbing member defines at least a part of the air passage. The noise absorbing member has an unbreathable middle layer, a first noise absorbing layer on an inner side of the middle layer and a second noise absorbing layer on an outer side of the middle layer. The second noise absorbing layer has a hardness greater than that of the first noise absorbing layer to maintain the shape of the noise absorbing member. Also, an air conditioner duct is formed of the multi-layer structure.

20 Claims, 3 Drawing Sheets

AIR CONDITIONER AND AIR CONDITIONER DUCT

CROSS REFERENCE TO RELATED APPLICATION

This application is based on Japanese Patent Application No. 2005-351175 filed on Dec. 5, 2005, the disclosure of which is incorporated herein by reference.

FIELD OF THE INVENTION

The present invention relates to an air conditioner for a vehicle having an air conditioning unit for conditioning air to be blown into a passenger compartment of the vehicle, and an air conditioner duct connecting the air conditioning unit and the passenger compartment.

BACKGROUND OF THE INVENTION

In an air conditioner for a vehicle and an air conditioner duct, it has been required to reduce noise caused by a flow of air, particularly, generated at locations adjacent to air suction openings and air discharge openings from being transmitted into a passenger compartment of the vehicle. In an air conditioner disclosed in Japanese Patent publication No. 2004-243816, for example, a noise absorbing member is attached to an inner surface of an air conditioning case housing a blower unit and defining an air passage so as to reduce the noise.

In this case, however, since the noise absorbing member is additionally attached to the air conditioning case, an area of passage reduces. To maintain the area of passage, the thickness and the size of the noise absorbing member are necessarily reduced. Therefore, it is difficult to sufficiently reduce the noise. Otherwise, it is necessary to increase the size of the air conditioning case.

Also, it is known to form an air conditioner duct with a noise absorbing material as disclosed in Japanese Patent publication No. 2001-322544, for example. In the air conditioner duct, a film is arranged along an outer surface or an inner surface of a noise absorbing layer made of a glass wool. The film restricts air from passing through the duct from an inside to an outside, but permits vibrations of air from the inside to outside of the duct, thereby to reduce the noise caused by air passing therethrough.

In this case, the noise absorbing layer needs to have the sufficient hardness so that the air conditioner duct can stand alone. However, the lower the hardness of a noise absorbing member is, the higher the noise absorbing effect is. Therefore, it may be difficult to have the noise absorbing effect sufficiently in the above duct. Also, in a case that the film is arranged on the outer surface of the duct, the film is likely to be easily broken when the duct is handled.

SUMMARY OF THE INVENTION

The present invention is made in view of the foregoing matter, and it is an object of the present invention to provide an air conditioner for a vehicle and a duct for an air conditioner, which has a noise absorbing member with an enhanced noise reducing effect and a shape maintainable structure without affecting an area of a passage.

According to an aspect of the air conditioner, an air conditioning unit has an air passage through which air to be introduced into a passenger compartment of a vehicle flows and an air conditioning case housing an air conditioning device for conditioning the air. The air conditioning case defines at least a part of the air passage. The air conditioning unit further has a noise absorbing member having a multi-layer structure. At least a part of the air passage is defined by the noise absorbing member.

The noise absorbing member has an unbreathable middle layer, a first noise absorbing layer disposed on an inner side of the middle layer and a second noise absorbing layer disposed on an outer side of the middle layer. The second noise absorbing layer has a hardness greater than that of the first noise absorbing layer to maintain the shape of the noise absorbing member.

In the above construction, an air shielding effect is provided by the unbreathable middle layer. Thus, it is less likely that the air will leak out through the noise absorbing member. Also, since the second noise absorbing layer has a sufficient hardness, the shape of the noise absorbing member can be maintained. Further, noise caused by a flow of the air can be effectively absorbed by the first noise absorbing layer, which has a hardness lower than the second noise absorbing layer. Furthermore, since the unbreathable middle layer is disposed between the first noise absorbing layer and the second noise absorbing layer, it will not be damaged when the air conditioner is assembled or handled.

According to an aspect of the duct, a wall defining an air passage has a multi-layer structure having an unbreathable middle layer, a first noise absorbing layer and a second noise absorbing layer. The first noise absorbing layer is disposed on an inner side of the middle layer. The second noise absorbing layer is disposed on an outer side of the middle layer and defines an outer surface of the duct.

In the above construction, an air shielding effect is provided by the unbreathable middle layer, and a noise reducing effect is provided by the noise absorbing layers. Since the duct itself is formed of the wall having the multi-layer structure, its passage area will not be affected.

For example, the second noise absorbing layer has a hardness greater than that of the first noise absorbing layer. Therefore, the shape of the air conditioner duct can be maintained by the second noise absorbing layer while enhancing the noise reducing effect with the first noise absorbing layer. As such, the air conditioner duct having the noise absorbing effect and the air shielding effect and being capable of maintaining the shape can be provided.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENT

An embodiment of the present invention will be described with reference to FIGS. 1 to 6. In the embodiment, an air conditioner is for example used for a vehicle such as a private car and a car for business or commercial use. The air conditioner is constructed such that a condition of air inside a passenger compartment of the vehicle can be automatically or manually controlled. Also, an air conditioner duct of the embodiment is for example mounted to a vehicle such as a private car and a car for business or commercial use for introducing air conditioned in the air conditioner into the passenger compartment.

The air conditioner has an air conditioner unit for conditioning the air. The conditioned air is introduced into the passenger compartment through the air conditioner duct. The air conditioner and the air conditioner duct enable to reduce noise and protect outer surfaces of noise absorbing parts.

Figure 1:
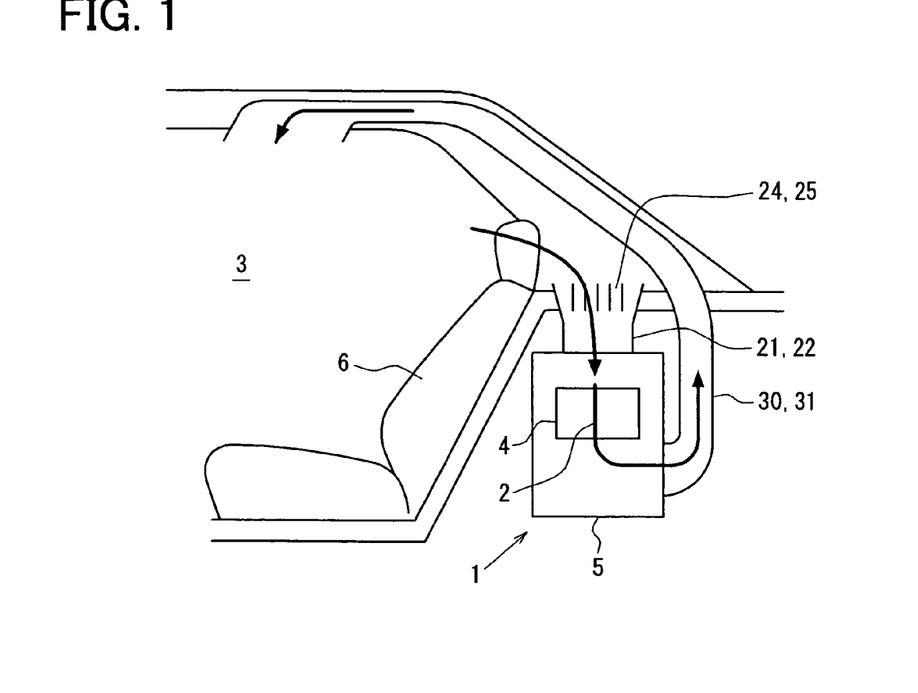
FIG. 1 is a schematic view of an air conditioner for a vehicle used as a rear passenger's seat air conditioning unit and an air conditioner duct according to an embodiment of the present invention.
Figure 2:
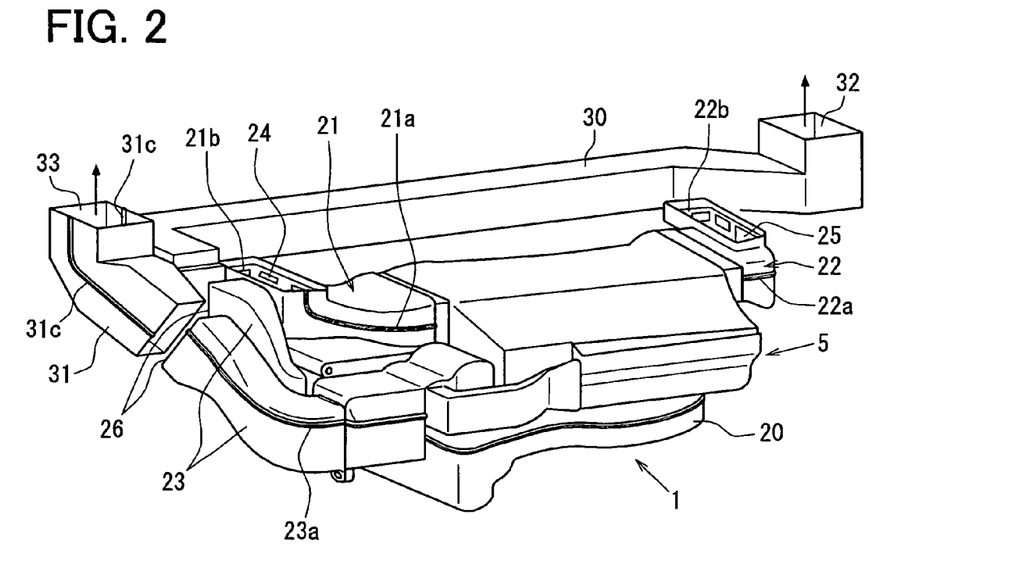
FIG. 2 is a schematic perspective view of the air conditioner and the air conditioner duct according to the embodiment.

As shown in FIGS. 1 and 2, the air conditioner has an air conditioning unit 1 for conditioning air. The air conditioned in the air conditioning unit 1 is introduced into a passenger compartment 3 through air conditioner ducts 30, 31. In this embodiment, the air conditioner is for example employed as a rear passenger seat air conditioner. The air conditioning unit 1 is for example mounted in a trunk room provided on a rear side of the passenger compartment 3.

The air conditioning unit 1 has a first suction duct 21, a second suction duct 22, air conditioning devices 4, and an air conditioning case (hereafter, case 5). The first suction duct 21 and the second suction duct 22 respectively define a first suction opening 24 and a second suction opening 25 opening on an upper surface of a package tray provided behind a rear passenger seat 6. The first suction duct 21 and the second suction duct 22 are coupled to the case 5. Thus, the case 5 is in communication with the passenger compartment through the first suction duct 21 and the second suction duct 22.

The air conditioning devices 4 are housed in the case 5 for conditioning the air drawn into the case 5 through the first suction duct 21 and the second suction duct 22. Further, the case 5 is coupled to the first and second air conditioner ducts 30, 31. The first and second air conditioner ducts 30, 31 respectively form first and second air blow openings 32, 33 disposed adjacent to sides of a ceiling of the passenger compartment 3. Thus, the air conditioning unit 1 is in communication with the passenger compartment 3 through the first air conditioner duct 30 and the second air conditioner duct 31.

The air conditioning unit 1 defines an air passage 2 through which the air drawn from the passenger compartment 3 flows toward the air conditioner ducts 30, 31. In other words, the first and second suction ducts 21, 22 and the case 5 define the air passage 2 through which the air to be introduced into the passenger compartment 3 after being conditioned flows.

The arrangement of the air conditioning unit 1 is not limited to the above. For example, the air conditioning unit 1 can be arranged at a position adjacent to a rear surface of a dash panel that is provided in front of the passenger compartment 3 for separating the passenger compartment from an engine compartment. In this case, the first air conditioner duct 30 and the second air conditioner duct 31 can be used as foot ducts for blowing air toward foot area of a passenger, i.e. a lower region of the passenger compartment 3.

The air conditioning devices 4 are for example heat exchangers such as an evaporator and a heater core, an air mix door and a switching door for switching air discharge openings, which are included as in an air conditioner unit, and a blower and an inside and outside air switching door, which are included as in a blower unit. The air conditioner unit and the blower unit are included in the air conditioning unit 1 and arranged at predetermined locations in the case 5.

As shown in FIG. 2, the case 5 is a generally flat casing. The height of the case 5 is smaller than the width thereof. The case 5 is for example constructed by joining plural resin molded parts.

The case 5 also forms a blower casing 20, and the blower unit is housed in the blower casing 20. The evaporator is arranged in the case 5 at a position capable of receiving air blown by the blower. The evaporator performs heat exchange between a low temperature and low pressure refrigerant, which has been decompressed in an expansion valve of a refrigerating cycle, and the air blown by the blower, to thereby evaporate the refrigerant.

The heater core heats the air passing therethrough by receiving heat from a cooling water of an engine for traveling. The heater core is arranged on the passage 2 defined in the case 5 at a position downstream of the evaporator with respect to the flow of air. Also, the heater core partly covers the passage 2.

Namely, the passage 2 separates into two passages downstream of the evaporator. A first passage communicates with the heater core and a second passage bypasses the heater core. The air mix door is arranged at a position downstream of the evaporator and upstream of the heater core. The air mix door is operated to control the volume of air directed to the first passage connecting to the heater core and the volume of air directed to the second passage bypassing the heater core.

The first suction duct 21 and the second suction duct 22 extend from the sides of the case 5 at upper portions of the air conditioning unit 1 and form the first suction opening 24 and the second suction opening 25 at the ends thereof, respectively. Thus, the air of the passenger compartment 3 is drawn into the first suction duct 21 and the second suction duct 22 from the first suction opening 24 and the second suction opening 25. The air having passed through the first suction duct 21 and the air having passed through the second suction duct 22 merge in the case 5.

In the case 5, the merged air passes through the air conditioning devices 4 while flowing through the passage 2. Then, the air is introduced into discharge ducts 23 arranged on one side of the air conditioning unit 1, and further introduced into the first air conditioner duct 30 and the second air conditioner duct 31 coupled to ends 26 of the discharge ducts 23. As such, the air is blown into the passenger compartment 3 from the first air blow opening 32 of the first air conditioner duct 30 and the second air blow opening 33 of the second air conditioner duct 31.

The air conditioning unit 1 further has a noise absorbing part (noise absorbing member). The noise absorbing part entirely or partly forms the outer shape or wall of the passage 2. The noise absorbing part has a function of absorbing noise caused by a flow of air in the passage 2. The noise absorbing part has a multi-layer structure having at least three layers.

Specifically, the noise absorbing part has a middle layer, a first noise absorbing layer (hereafter, first layer) and a second noise absorbing layer (hereafter, second layer). The middle layer is interposed between the first layer and the second layer.

The middle layer is unbreathable. Namely, the middle layer does not allow the air passing through the passage 2 to leak outside. The first layer is arranged on an inner side of the middle layer for absorbing the noise caused by the air passing through the passage 2. Also, the second layer is arranged on an outer side of the middle layer so as to protect the middle layer and maintain the shape of the noise absorbing part.

The middle layer is preferably made of a material having high ductility or low rigidity. For example, the middle layer is constructed of a high-density polyethylene film, a metallic thin plate, a resin plate with an aluminum foil, a high-barrier PET lamination film, a nylon lamination film, an ethylene-vinyl alcohol copolymer (EVOH) film, or the like. Also, since the middle layer needs to have the function of restricting leakage of the air from the air passage 2, it is preferably made by a material having a sufficient air-barrier. For example, the ethylene-vinyl alcohol copolymer (EVOH) has a high air-barrier and an effect of sufficiently blocking odors of the air.

The first and second layers are preferably constructed of a member having a porous structure, a filament member formed by delicate filamentous materials, or a foamed resin. For example, the first and second layers are made of porous polyethylene terephthalate (PET), felt, glass wool, rock wool, chloroprene rubber (CR sponge material), a mixture of resin and fabric, open cell urethane, or the like. Also, it is not always necessarily that the first and second layers are made of the same material.

In the air conditioning unit 1, it is preferable to form at least a portion of the passage 2 that is located at positions where the flow of air is easily disturbed and the noise is easily generated with the noise absorbing member. For example, at least a part of the case 5 can be formed by the noise absorbing member. For example, a wall of the blower casing 20 enclosing the blower unit is formed of the noise absorbing member. Also, bent or curved walls of the case 5 where the flow direction of the air is changed e.g., around the evaporator and the heater core and portions adjacent to an outlet and an inlet of the air conditioner unit, an air discharge opening switching door and the inside and outside air switching door, can be formed of the noise absorbing member.

Further, the first suction duct 21 and the second suction duct 22 can be formed of the noise absorbing member. Because the first suction duct 21 and the second suction duct 22 are located adjacent to the passenger compartment 3, noise generated in the air conditioner unit 1 is likely to be conducted into the passenger compartment 3 through the first suction opening 24 and the second suction opening 25. By improving an absorbing coefficient of noise propagating in the ducts 21, 22, a noise reduction effect improves.

Figure 3:
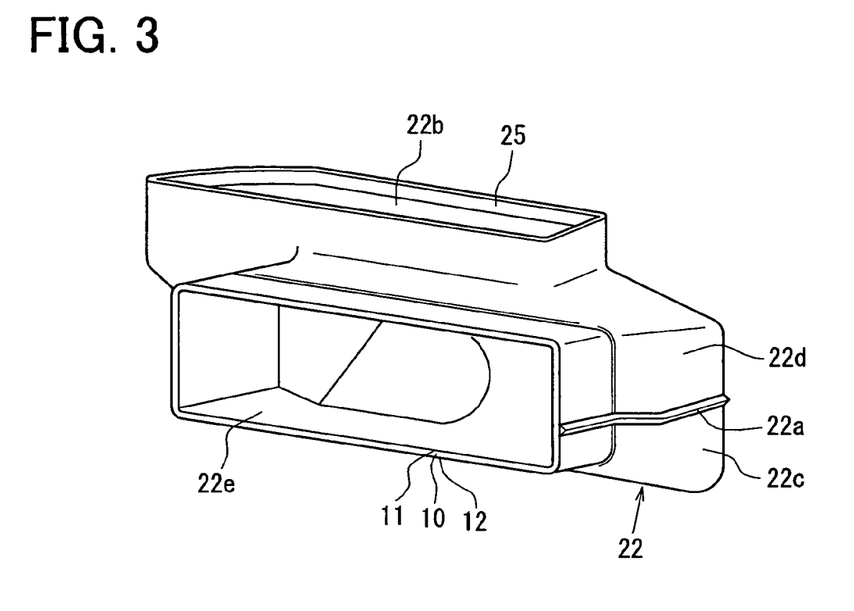
FIG. 3 is a perspective view of a second suction duct of the air conditioner according to the embodiment.
Figure 4:
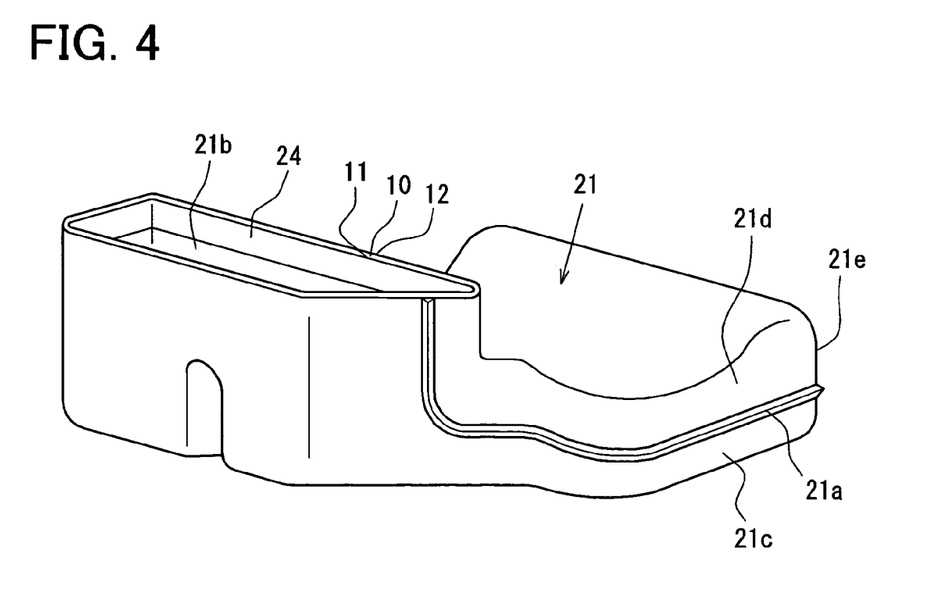
FIG. 4 is a perspective view of a first suction duct of the air conditioner according to the embodiment.

To form each of the first suction duct 21 and the second suction duct 22 with the noise absorbing member, for example, plural parts formed of the noise absorbing member can be joined, as shown in FIGS. 3 and 4. Next, structures of the first and second suction ducts 21, 22 and an example of forming the first and second suction ducts 21, 22 with the noise absorbing member will be described.

As shown in FIG. 3, the second suction duct 22 has the second suction opening 25 at its first end and a second discharge opening 22e at its second end. The second suction opening 25 is in communication with the second discharge opening 22e through a body of the second suction duct 22. Also, the second suction duct 22 has a generally rectangular shaped cross-section. The second suction duct 22 is constructed of a second suction duct lower part 22c and a second suction duct upper part 22d. Each of the second suction duct lower part 22c and the second suction duct upper part 22d is made of the noise absorbing member having the multi-layer structure with at least three integrated layers. Also, a frame member 22b can be disposed inside of the second suction duct 22 so as to maintain the shape of the second suction duct 22.

Specifically, the noise absorbing member forming each of the second suction duct lower part 22c and the second suction duct upper part 22d has a plate member 10 as the unbreathable middle layer, a first noise absorbing member 11 as the first layer, and a second noise absorbing member 12 as the second layer. The noise absorbing member is formed into a predetermined shape to form each of the second suction duct lower part 22c and the second suction duct upper part 22d.

The second suction duct lower part 22c and the second suction duct upper part 22d are joined at those ends 22a such as by welding using a heat press, vibration welding, or with a bonding agent. Alternatively, the second suction duct lower part 22c and the second suction duct upper part 22d can be joined by engaging the ends 22a. Accordingly, the second suction duct 22 having the shape shown in FIG. 3 is produced. Also, in the finished-product of the second suction duct 22, the ends 22 slightly project from a surface of the second suction duct 22. The ends 22 extend along an axis of the second suction duct 22.

Likewise, as shown in FIG. 4, the first suction duct 21 has the first suction opening 24 at its first end and a first discharge opening 21e at its second end. The first suction opening 24 is in communication with the first discharge opening 21e through a body of the first suction duct 21. Also, the first suction duct 21 has a generally rectangular-shaped cross-section.

Further, the first suction duct 21 is constructed of the first suction duct lower part 21c and the first suction duct upper part 21d. Further, a frame member 21b can be disposed inside of the first suction duct 21 so as to maintain the shape of the first suction duct 21.

Also, each of the first suction duct lower part 21c and the first suction duct upper part 21d is constructed of the noise absorbing member having at least three integrated layers 10 to 12, similar to the second suction duct 22. Each of the first suction duct lower part 21c and the first suction duct upper part 21d is produced by forming the noise absorbing member into a predetermined shape.

The first suction duct lower part 21c and the first suction duct upper part 21d are joined at those ends 21a by such as welding using a heat press, vibration welding, or with a bonding agent. Alternatively, the first suction duct lower part 21c and the first suction duct upper part 21d can be joined by engaging the ends 21a. Accordingly, the first suction duct 21 having the shape shown in FIG. 4 is produced. In the finished-product of the first suction duct 21, the ends 21 slightly project from a surface of the first suction duct 21. Also, the ends 21 extend along an axis of the first suction duct 21.

In the first suction duct 21 and the second suction duct 22, the first layers 11 faces the inside of the duct, i.e., define inner surfaces of the ducts 21, 22. Also, the second layers 12 define outer surface of the ducts 21, 22.

The portion of the case such as the blower casing 20 can be also formed in the similar manner as the first and second suction ducts 21, 22.

Next, structures of the first and second air conditioner ducts 30, 31 will be described. Similar to the first and second suction ducts 21, 22, each of the first air conditioner duct 30 and the second air conditioner duct 31 is formed by joining separate parts made of the noise absorbing member.

Figure 5:
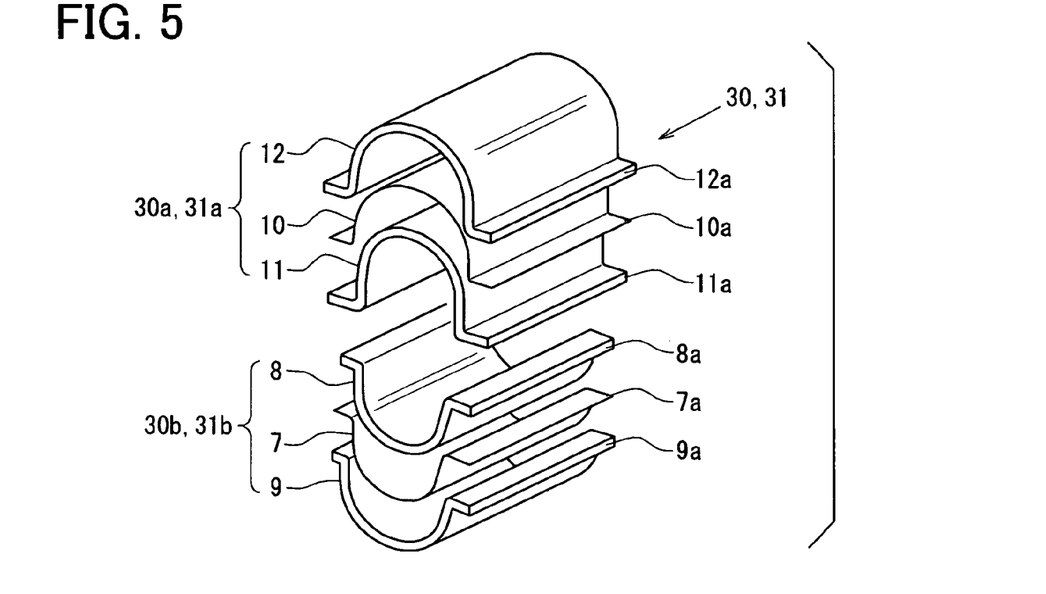
FIG. 5 is an exploded perspective view of a part of the air conditioner duct according to the embodiment.

As shown in FIG. 5, the first air conditioner duct 30 is constructed of a first air conditioner duct upper part 30a and a first air conditioner duct lower part 30b. Each of the first air conditioner duct upper part 30a and the first air conditioner duct lower part 30b is made of the noise absorbing member having at least three integrated layers.

Specifically, the first air conditioner duct upper part 30a has the plate member 10 as the middle layer, the first noise absorbing member 11 as the first layer and the second noise absorbing member 12 as the second layer. Each of the plate member 10, the first noise absorbing member 11 and the second noise absorbing member 12 is formed into a predetermined shape, such as by bending using a thin rolled layer.

The members 10 to 12, shaped as above, are arranged in layers and integrated such as by pressing so as to have the shape of the first air conditioner duct upper part 30a. For example, the layers 10 to 12 are bonded to each other by welding using heat pressing. In this welding, the layers are bonded one another with polyethylene resin by melting the polyethylene resin.

For example, powder of polyethylene resin can be applied between the layers previously. When melted, the powder of polyethylene resin functions as a bonding agent bonding the layers. As another example, the middle layer 10 can be made of polyethylene resin. Thus, the middle layer 10 itself can function as the bonding agent.

However, the middle layer 10 is not limited to the polyethylene resin layer. The middle layer 10 can be constructed of a bonding material in a form of film and with unbreathable. Thus, the bonding material functions as the unbreathable middle layer as well as the bonding agent for integrating the first and second noise absorbing layers 11, 12 to the middle layer. The above-described noise absorbing member constructing the first and second suction ducts 21, 22 can also be made by similar methods.

Likewise, the first air conditioner duct lower part 30b is made of the noise absorbing member having the multi-layer structure. Specifically, the first air conditioner duct lower part 30b has a plate member 7 as the unbreathable middle layer, a first noise absorbing member 8 as the first layer, and a second noise absorbing member 9 as the second layer.

Each of the plate member 7, the first noise absorbing member 8 and the second noise absorbing member 9 is formed into a predetermined shape, such as by bending using a thin rolled layer. The members 7 to 9, shaped as above, are arranged in layers and integrated such as by pressing to have the shape of the first air conditioner duct lower part 30b. For example, the layers 7 to 9 are bonded to each other by welding using heat pressing, similar to the first air conditioner duct upper part 30a.

The first air conditioner duct upper part 30a and the first air conditioner duct lower part 30b, formed as above, are joined to each other by bonding ends 7a to 12a, which extend along an axis of each parts 30a, 30b, such as by welding using heat press, or vibration welding, or with the bonding agent.

The second air conditioner duct 31 is constructed of the second air conditioner duct upper part 31a and the second air conditioner duct lower part 31b. Each of the second air conditioner duct upper part 31a and the second air conditioner duct lower part 31b is formed of the noise absorbing member having the multi-layer structure, similar to the first air conditioner duct upper part 30a and the first air conditioner duct lower part 30b of the first air conditioner duct 30.

The above noise absorbing member can be formed by another different method. For example, the noise absorbing member can be formed by inserting the middle layer between the two noise absorbing layers. In this case, the middle layer is formed of such as an unbreathable polyethylene film, a metallic thin plate, or a resin plate with aluminum foil. Also, the noise absorbing layers are for example formed of molten resin having a porous structure, such as polyethylene terephthalate.

The noise absorbing member is formed by using an insert-molding device with dies. The middle layer as an insert member is loaded in a cavity of the dies. Then, the molten resin is inserted into the cavity so as to cover or wrap the insert member, and then hardened. As such, the middle layer, the first noise absorbing layer and the second noise absorbing layer are integrated into the multi-layered noise absorbing member. Accordingly, even when the portion of the air conditioning unit 1 to be made of the noise absorbing member and the air conditioner ducts 30, 31 have complex shapes for fixing and complex portions for engagement requiring high dimensional accuracy, these can be formed of the noise absorbing member using the above-described methods.

Next, plural ducts having different structures are prepared, and differences of noise reduction effects due to structural differences are compared. The following ducts (A) to (D) are prepared. The duct (A) is a general resin duct. The duct (B) has a noise absorbing layer, which has high rigidity, and an outer surface of the noise absorbing member is coated with an unbreathable film. The duct (C) has noise absorbing layers both having high rigidity, and an unbreathable film between the noise absorbing layers.

Further, the duct (D) has an inner noise absorbing layer, an outer noise absorbing layer and an unbreathable film between the noise absorbing layers. The inner noise absorbing layer is located on an inner side of the unbreathable film and the outer noise absorbing layer is located on an outer side of the unbreathable film. In the duct (D), the inner noise absorbing layer has a rigidity lower than that of the outer noise absorbing layer.

Each of the ducts (A) to (D) has a length of 300 mm and a square-shape cross-section in which each side is 50 mm. A sound source (sound level=120 dB) is arranged at an end of each duct and a sound level is measured at a position 100 mm apart from the opposite end of the duct. A sound generated by the sound source will be absorbed while passing through the duct. The level of the sound is detected when the sound is discharged from the opposite end of the duct, as an A weighted sound pressure level.

The sound level of the duct (A) is 106.8 dB. The sound levels of the remaining ducts (B) to (D) are compared to the sound level of the duct (A) as a reference level. The sound level of the duct (B) is 8.9 dB lower than the reference level. The sound level of the duct (C) is 7.5 dB lower than the reference level. The sound level of the duct (D) is 12.2 dB lower than the reference level.

Accordingly, the duct (D) has the largest noise reduction effect. The sound level of the duct (B) is lower than that of the duct (C). In the duct (B), however, since the unbreathable film is arranged on the outer side, it may be easily broken while the duct is handled and is difficult to sufficiently maintain the air shielding function.

Further, in the duct (D), when a sound wave passes through a duct, sound energy is reduced by viscosity resistance and friction between air molecules and the inner wall of the duct, i.e., the inner noise absorbing layer. The air molecules, which has lost the sound energy, is reflected by the middle layer toward the inside of the duct, and then discharged from the duct. Therefore, the reduction of the sound energy is largely affected by the structure of the noise absorbing layer. At this time, the sound energy is partly propagated to the outer noise absorbing layer that is arranged on an outer side of the middle layer as vibrations.

Based on this theory and the examination results, it is preferable that the inner noise absorbing layer, which is located on the inner side of the unbreathable middle layer, is softer or more flexible than the outer noise absorbing layer, which is located on the outer side of the unbreathable middle layer. In other words, it is preferable that the outer noise absorbing layer has hardness greater than that of the inner noise absorbing layer.

Also, to enhance the decrease of the sound energy, it is preferable to increase a distance of a path of the air molecules. i.e., a thickness of the inner noise absorbing layer. Namely, it is preferable that the inner noise absorbing layer is thicker than the outer noise absorbing layer.

Further, an effect of reducing entry of odors from outside of the noise absorbing part having the unbreathable middle layer is examined by using ducts having different structures. Ducts (L) to (N) having different structures are prepared and the entry of odor in the ducts (L) to (N) is tested. The reduction of entry of odor is effective when the air of a space where the air conditioner unit and the air conditioner ducts 30, 31 are located has odor components.

For example, if an object generating odor is mounted in the trunk room, the odor is likely to enter the air conditioning unit and the dir conditioner ducts through the noise absorbing part and be further introduced into the passenger compartment with the air. However, when the noise absorbing part has the effect of shielding the odor components, it is less likely that the odor components will enter the air conditioner and the air conditioner ducts through the noise absorbing part and be introduced into the passenger compartment 3 with the air.

The duct (L) is a general resin duct. The duct (M) is a noise absorbing duct having a noise absorbing layer, but without having an unbreathable film. The duct (N) is a noise absorbing duct having inner and outer noise absorbing layers and an unbreathable film between the inner and outer noise absorbing layers. Levels of odors that pass through the ducts (L) to (N) are shown in FIG. 6.

In the test, an object generating an odor is placed in a first area that is separated from a second area where subjects (people) are. The second area is in communication with the first through an inside of each of the ducts (L) to (N). There are 17 subjects in the second area. At a time of starting the test, there is an odor in the first area on a level such that the object generating the odor may be recognized. Each of the ducts (L) to (N) is placed in the first area, and a level of odor that the subjects smell with the elapse of time is tested.

Figure 6:
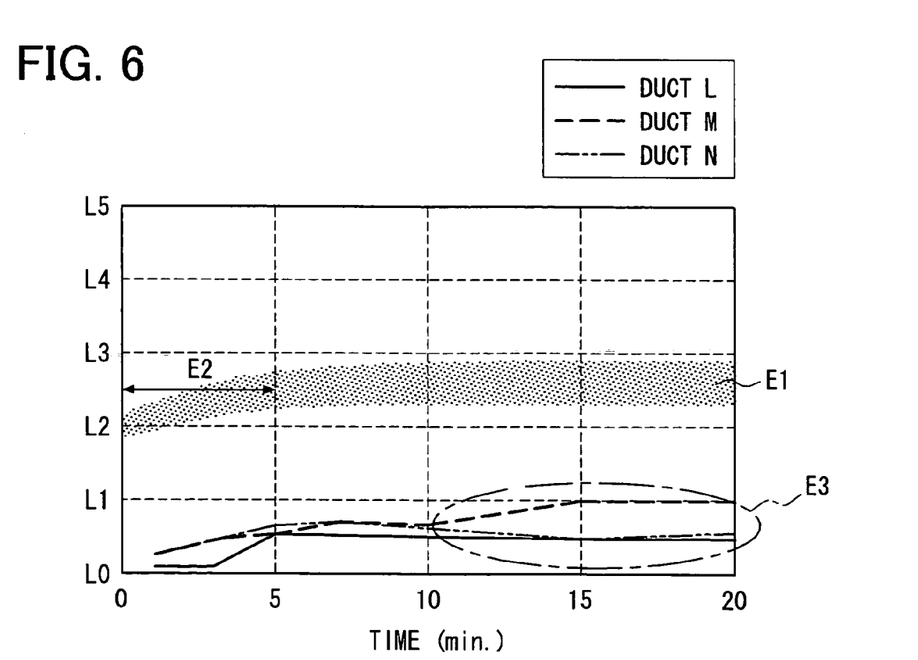
FIG. 6 is a graph showing a level of an odor passing through the air conditioner duct of the embodiment and levels of odors passing through comparative air conditioner ducts with the elapse of time.

In FIG. 6, the level of odor is defined by six levels from L0 to L5. L0 is a level that there is no odor. L1 is a level that people faintly notice the odor. L2 is a level that people can recognize the object generating the odor. L3 is a level that people surely notice the odor. L4 is a level that people strongly feel the odor. L5 is a level that people feel the odor very strong. Also, in FIG. 6, a dotted area E1 denotes a level of odor in the first area.

As shown in FIG. 6, at a starting time (denoted by an arrow E2), the levels are unstable. There is no large gap between the ducts L to N for some time after the start of the test (e.g., 5 to 10 minutes). As denoted by a dotted circle E3, the levels begin to vary about 10 minutes after the start of the test. Then, about 15 minutes after the start of the test, the level of odor of the duct M, which does not have the unbreathable film, increases higher than the other ducts L, M. On the other hand, the levels of the ducts L, N are still very low, and the subjects have hardly noticed the odor, yet.

Accordingly, the duct N having the unbreathable film between the noise absorbing layers has an odor shielding effect. Therefore, it is preferable to form the middle layer with a film or a plate member having the odor shielding effect. For example, the middle layer can be formed by a plate member made of ethylene-vinyl alcohol copolymer (EVOH).

In the embodiment, the noise absorbing member has the multi-layer structure including the middle layer 10 and the outer and inner noise absorbing layers 11, 12. The middle layer 10 is made of the unbreathable film or plate. The outer noise absorbing layer 12 have the hardness greater than that of the inner noise absorbing layer 11. The inner noise absorbing layer 11 has a sufficient noise absorbing effect. As such, the noise absorbing member provides the sufficient noise absorbing effect and the air shielding effect while maintaining the shape with the outer noise absorbing layer 12.

In the air conditioner, at least a part of the passage defined in the air conditioning unit 1 is formed of the above noise absorbing member having the first noise absorbing layer 11, the second noise absorbing layer 12 and the middle layer 10 between them. For example, the blower case 20, the first and second suction ducts 21, 22 and the discharge duct 23 can be formed of the noise absorbing member. Therefore, the noise caused by the air passing through the passage 2 is effectively reduced by the noise absorbing member. With this, the noise transmitted into the passenger compartment 3 is reduced.

Also, it is less likely that the air will leak through the noise absorbing member because of the unbreathable middle layer 10. Further, since the unbreathable middle layer 10 is not bare, it is less likely that the unbreathable layer will be broken when it is handled.

Further, the second noise absorbing layer 12 has the hardness greater than that of the first noise absorbing layer 11. Therefore, even when the noise absorbing member is used to form the outer wall of the case 5 or the ducts 21, 22, the shape of the respective parts can be sufficiently maintained by the second noise absorbing layer 12. Also, the noise is effectively reduced by the first noise absorbing layer 11.

The first suction duct 21 and the second suction duct 22 are generally close to the passenger compartment 3. Since the first suction duct 21 and the second suction duct 22 are formed of the noise absorbing member, the noise is effectively reduced by the noise absorbing member. Thus, it is less likely that the passenger compartment 3 will be affected by the noise generated in the first and second suction ducts 21, 22.

Further, the first suction duct 21 and the second suction ducts 22 can be formed by joining the separate parts 21c, 21d, 22c, 22d made of the noise absorbing member. As such, even the ducts having the complex shape or a large length can be formed of the noise absorbing member. Also, the first and second suction ducts 21, 22 themselves are formed of the noise absorbing member. Thus, the ducts having the sufficient noise absorbing effect and the sufficient rigidity can be produced.

In the noise absorbing member, the plate member 10 as the middle layer can be insert-molded between the first noise absorbing layer 11 and the second noise absorbing layer 12. By this method, even when the part of the case 5, the first suction duct 21 and the second suction duct 22 have complex shape, these parts can be formed by the noise absorbing member.

When the blower case 20 is formed of the noise absorbing member, noise due to vibration of the blower unit and disturbance of air flow in the passage therein can be effectively reduced.

In addition, the thickness of the first noise absorbing layer 11 can be greater than that of the second noise absorbing layer 12. By this, the noise absorbing coefficient of the first noise absorbing layer 11 increases. Therefore, the noise absorbing effect of the noise absorbing member can be improved.

The first noise absorbing layer 11 and the second noise absorbing layer 12 can be the filament members made of delicate filaments. The density of the filaments can be adjustable. As such, each of the first noise absorbing layer 11 and the second noise absorbing layer 12 can be produced so as to have a desired hardness and a desired noise absorbing efficiency.

The middle layer 10 can be formed of the plate member or the film having the odor shielding effect. Even if the air outside of the air conditioner contains the odor components, it is less likely that the odor components will enter the air passage 2 through the noise absorbing member and be introduced into the passenger compartment 3 with the conditioned air.

The middle layer 10 can be formed of the adhesive material in the form of film between the inner noise absorbing layer 11 and the outer noise absorbing layer 12. In this case, the middle layer 10 can be formed by the adhesive material for adhering the inner noise absorbing layer 11 and the outer noise absorbing layer 12. Therefore, it is not necessary to prepare the film or the plate member as the middle layer. Thus, the number of parts and costs will be reduced.

Each of the air conditioner ducts 30, 31 for introducing the conditioned air from the air conditioner to the passenger compartment 3 is formed of the noise absorbing member having the middle layer 7, 10, the first noise absorbing layer 8, 11 and the second noise absorbing layer 9, 12. Therefore, the noise of the air flowing therein can be sufficiently reduced, without decreasing the area of the passage and increasing the outer size of the ducts 30, 31.

The second noise absorbing layer 9, 12 can have the predetermined hardness higher than that of the first noise absorbing layer 8, 11 so as to maintain the shape of the air conditioner ducts 30, 31. Also, since the first noise absorbing layer 8, 11 have the hardness lower than that of the second noise absorbing layer 9, 12, the noise absorbing coefficient of the first noise absorbing layer 8, 11 improves. Thus, the noise caused by the flow of air can be effectively absorbed.

The ducts 30, 31 themselves are formed of the noise absorbing member. Namely, the ducts 30, 31 have the multi-layer structure having the first and second noise absorbing layers 8, 9, 11, 12 entirely along its circumference. Thus, the noise absorbing efficiency improves while maintaining the shape and the air-shielding effect.

Each of the air conditioner ducts 30, 31 can be formed by joining the parts 30a, 30b, 31a, 31b made of the noise absorbing member. Therefore, even when the long ducts 30, 31 having a complex shape can be formed of the noise absorbing member.

In the parts 30a, 30b, 31a, 31b constructing the ducts 30, 31, the plate member 10 as the middle layer can be insert-molded between the first noise absorbing layer 8, 11 and the second noise absorbing layer 9, 12. Therefore, even the ducts 30, 31 having the complex fixing shape and the complex engagement portions can be formed of the noise absorbing member.

Further, the first noise absorbing layer 8, 11 can have the thickness greater than that of the second noise absorbing layer 9, 12. In this case, the noise absorbing coefficient can be increased.

Also, the first noise absorbing layer 8, 11 and the second noise absorbing layer 9, 12 can be the filament members made of delicate filaments. The density of the filaments can be adjustable. As such, each of the first noise absorbing layer 8, 11 and the second noise absorbing layer 9, 12 can be produced so as to have a desired hardness and a desired noise absorbing efficiency.

Also in the ducts 30, 31, the middle layer 10 can be formed of the plate member or the film having the odor shielding effect. Even if the air outside of the ducts 30, 31 contains the odor components, it is less likely that the odor components will enter the passage through the noise absorbing member and be introduced into the passenger compartment 3 with the conditioned air.

Further, the middle layer 7, 10 can be formed of the adhesive material in the form of film between the first noise absorbing layer 8, 11 and the second noise absorbing layer 9, 12. In this case, the middle layer 7, 10 can be formed by the adhesive material for adhering the first noise absorbing layer 8, 11 and the second noise absorbing layer 9, 12. Therefore, it is not necessary to prepare the film or the plate member as the middle layer. Thus, the number of parts and costs will be reduced.

The example embodiments of the present invention are described above. However, the present invention is not limited to the above example embodiments, but may be implemented in other ways without departing from the spirit of the invention.

What is claimed is:

1. An air conditioner for a vehicle, having an air conditioning unit mounted to the vehicle for conditioning air to be introduced to a passenger compartment of the vehicle, the air conditioning unit comprising:
   an air passage through which the air flows;
   an air conditioning case defining at least a part of the air passage therein;
   an air conditioning device disposed in the air conditioning case conditioning the air; and
   a noise absorbing member configuring at least a part of an outer shell of the air passage, wherein
   the noise absorbing member is configured by a three-layer structure of an unbreathable middle layer, a first layer disposed on an inner side of the middle layer and a second layer disposed on a side of the middle layer opposite to the first layer with respect to the middle layer,
   the second layer has a hardness greater than that of the first layer; and
   both the first layer and the second layer are made of a filament material.

2. The air conditioner according to claim 1, wherein
   the air conditioning unit further comprises a duct that defines a part of the air passage and allows communication between the air conditioning case and the passenger compartment, and
   the duct is constructed of the noise absorbing member.

3. The air conditioner according to claim 2, wherein
   the duct has a plurality of duct parts each of which is constructed of the noise absorbing member, and
   the duct parts are joined to each other, thereby to define an outline of the duct.

4. The air conditioner according to claim 1, wherein the middle layer is insert-molded between the first layer and the second layer.

5. The air conditioner according to claim 1, wherein at least a part of the air conditioning case is constructed of the noise absorbing member.

6. The air conditioner according to claim 5, wherein
   the air conditioning device includes a blower, and
   the part of the air conditioning case defines a blower casing portion for housing the blower therein.

7. The air conditioner according to claim 1, wherein the first layer has a thickness greater than that of the second layer.

8. The air conditioner according to claim 1, wherein the middle layer is a member having an odor shielding effect.

9. The air conditioner according to claim 1, wherein the middle layer is constructed of an adhesive material in a form of film.

10. The air conditioner according to claim 1, wherein the first layer faces an inside of the passage and the second layer defines an outer surface of the passage.

11. The air conditioner according to claim 1, wherein the first layer is in direct contact with the entire inner side of the middle layer and the second layer is in direct contact with the entire side of the middle layer opposite to the first layer with respect to the middle layer.

12. The air conditioner according to claim 1, wherein the air conditioner case includes a duct defining the at least the part of the air passage, the duct being formed by a single wall defined by the three-layer structure of the noise absorbing member.

13. The air conditioner according to claim 1, wherein the entire outer shell of the air passage is defined by the noise absorbing member.

14. The air conditioner according to claim 1, wherein the first and second layers have a porous structure.

15. An air conditioner for a vehicle having an air conditioning unit mounted to the vehicle for conditioning air to be introduced to a passenger compartment of the vehicle, the air conditioning unit comprising:

an air conditioning case having a duct having an outer wall defining an air passage;

an air conditioning device disposed in the air conditioning case conditioning the air; wherein the duct is formed from a noise absorbing member forming the entire outer wall of the duct;

the noise absorbing member has an unbreathable middle layer, a first layer in direct contact with an inner side of the middle layer and a second layer in direct contact with an outer side of the middle layer;

the outer side of the middle layer being opposite to the inner side of the middle layer; and the second layer has a hardness greater than the first layer.

16. The air conditioner according to claim 15, wherein the first layer is in direct contact with the entire inner side of the middle layer and the second layer is in direct contact with the entire side of the middle layer opposite to the first layer with respect to the middle layer.

17. The air conditioner according to claim 16, wherein an inner surface of the duct defines the air passage, the entire inner surface of the duct being defined by the first layer of the noise absorbing member.

18. The air conditioner according to claim 15, wherein an inner surface of the duct defines the air passage, the entire inner surface of the duct being defined by the first layer of the noise absorbing member.

19. The air conditioner according to claim 15, wherein the first and second layer have a porous structure.

20. The air conditioner according to claim 15, wherein the middle layer forms a barrier prohibiting air flow through the middle layer.

* * * * *

UNITED STATES PATENT AND TRADEMARK OFFICE
CERTIFICATE OF CORRECTION

PATENT NO. : 7,654,099 B2
APPLICATION NO. : 11/633680
DATED : February 2, 2010
INVENTOR(S) : Mizutani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this

Twenty-third Day of November, 2010

David J. Kappos
*Director of the United States Patent and Trademark Office*